US012343729B2

(12) United States Patent
Dobroszczyk et al.

(10) Patent No.: US 12,343,729 B2
(45) Date of Patent: Jul. 1, 2025

(54) PIPETTING SUPPORT DEVICE, USE THEREOF AND METHOD FOR PIPETTING LIQUID

(71) Applicant: Roche Molecular Systems, Inc., Pleasanton, CA (US)

(72) Inventors: Sylvia Dobroszczyk, Karlsbad (DE); Jie Pu, Pforzheim (DE)

(73) Assignee: Roche Molecular Systems, Inc., Pleasanton, CA (US)

( * ) Notice: Subject to any disclaimer, the term of this patent is extended or adjusted under 35 U.S.C. 154(b) by 578 days.

(21) Appl. No.: 17/149,959

(22) Filed: Jan. 15, 2021

(65) Prior Publication Data

US 2021/0213455 A1 Jul. 15, 2021

(30) Foreign Application Priority Data

Jan. 15, 2020 (EP) .................................... 20151877

(51) Int. Cl.
*B01L 9/00* (2006.01)
*B01L 3/00* (2006.01)

(52) U.S. Cl.
CPC ............ *B01L 9/54* (2013.01); *B01L 3/50853* (2013.01); *B01L 2300/045* (2013.01)

(58) Field of Classification Search
CPC ...... B01L 3/5085; B01L 3/50853; B01L 9/54; B01L 2300/045; B01L 2300/046
See application file for complete search history.

(56) References Cited

U.S. PATENT DOCUMENTS 7,597,854 B1 10/2009 Reynolds
7,713,487 B1 * 5/2010 Locklear ............... B01L 3/5085 422/501
2002/0189374 A1 * 12/2002 DeSilets ................ C12M 23/12 73/864.51
2006/0288761 A1 12/2006 Kinnunen
2007/0009396 A1 * 1/2007 Ho ...................... B01L 3/50853 422/400
2013/0040406 A1 2/2013 Rostaing
2019/0091682 A1 * 3/2019 Drews ..................... B01L 9/527

FOREIGN PATENT DOCUMENTS

WO 2007005719 A2 1/2007
WO 2018007290 A1 1/2018

* cited by examiner

*Primary Examiner* — Matthew D Krcha
*Assistant Examiner* — Austin Q Le
(74) *Attorney, Agent, or Firm* — Maneesh Gupta

(57) ABSTRACT

The present disclosure is directed to a device for supporting manual pipetting of liquids, to the use of such a pipetting support device, and to a method for pipetting liquid, for example from a number of first vessels to a number of second vessels, wherein a moving unit is movable in relation to a first plate and at least partially covers the first plate during use of the pipetting support device, and at least one edge of the moving unit provides guidance to support a manual pipetting procedure from said first plate to said second plate, or vice versa.

14 Claims, 5 Drawing Sheets

PIPETTING SUPPORT DEVICE, USE THEREOF AND METHOD FOR PIPETTING LIQUID

CROSS-REFERENCE TO RELATED APPLICATION

This application claims the benefit and priority of European Application Serial No. 20151877.6, filed Jan. 15, 2020, which is incorporated herein by reference.

TECHNICAL FIELD

Generally, the present disclosure relates to liquid sample handling in a laboratory or the like. In many medical and nonmedical applications, liquid samples have to be handled accurately by a user, such as laboratory personnel, to prepare or carry out tests.

In particular, the present disclosure is directed to a device for supporting manual pipetting of liquids. The present disclosure is also directed to the use of such a pipetting support device, and to a method for pipetting liquid, for example from a number of first vessels to a number of second vessels.

In other words, the present disclosure relates to a pipetting support device suitable to simplify the handling of liquid samples, such as the transport of liquid samples from a first row or array of vessels to a second row or array of liquid vessels. The present disclosure also relates to the use of the pipetting support device as a support for manually pipetting liquid samples. Finally, the present disclosure relates to a method for manually pipetting liquid samples using such a pipetting support device.

BACKGROUND

Many tests carried out in a chemistry, biology or medical laboratory are based on liquid samples. These liquid samples are usually processed by a laboratory worker by hand in different successive steps. Between each of these steps, the samples have to be treated and stored. In everyday laboratory routine, a huge number of liquid samples, usually stored in small liquid vessels, have to be handled and organized. A common way to store and handle liquid samples is the use of microplates, also referred to as microtiter plates or multiwells. Such microplates are flat plates with multiple vessels or wells used as small liquid containing test vessels. Such micro plates have become a standard tool in analytic research and clinical diagnostic testing. Microplates typicality contain a number of vessels, for example 6, 12, 24, 48, 96, 384 or 1536 vessels arranged in a rectangular matrix. The rows and columns of such a matrix arrangement are usually labeled with fiducial markers to give each vessel in the microplate a unique address. Microplates are typically designed as consumable products that are only used one time and are disposed after use. Another possibility to store and handle liquid samples is the use of single vessels which are not permanently connected to each other. For example, in a laboratory, very particular and usually small volumes of liquid have to the transported from one microreaction vessel to the other, wherein these kinds of reaction vessels can be very thin-walled and are often used for a polymerase chain reaction (PCR). Here, such microreaction vessels can be called Eppendorf tubes, or "Eppi" in short, which comes from the most common manufacturer's brand name. During each processing step or between different processing steps, the liquids are often transported from one vessel to the other.

As tool for handling liquids in a laboratory, a pipette, also referred to as pipet, dropping glass or dropper, is usually the laboratory tool commonly used in chemistry, biology and medicine to transport a measured volume of liquid from one location to the other. A pipette usually can only transport one type of liquid samples at one step. Since the vessels that contain the liquid samples are usually very small, laboratory staff often requires a pipetting support device receiving such microreaction vessels, in order to achieve a more sufficient throughput when pipetting and transporting liquids. To transport or to process several liquid samples from a first number of vessels to a second number of vessels, a pipette has to be emptied before picking up a new sample. Therefore the pipetting is done in cycles which comprise several steps. The pipette in the first step is moved to a first liquid containing vessel, also referred to as source vessel, picks up the liquid sample, and then, in a second step, is moved to a second vessel, also referred to as destination vessel, where the liquid sample is removed from the pipette and transported into the destination vessel. After such removal of content, the pipette, in a third step, usually has to be cleaned, or a disposable tip of the pipette has to be switched. After this last step of a cycle, the pipette is moved to the next source vessel in order to carry out the next cycle. When pipetting manually, the risk of mixing up source vessels or destination vessels is rather high. Thus, mixing up samples during pipetting can lead to undesired false test results and therefore has to be strictly avoided. Accordingly, in order to avoid mixing up liquid samples during manual pipetting, laboratory staff has to work extremely concentrated and slow, in order to avoid pipetting mistakes. This, however, leads to long processing times, and generates undesired work-related stress for the laboratory staff.

To avoid the disadvantages of manual pipetting, automated laboratory devices are known in the present technical field, such as analyser robots, which carry out pipetting automatically, without involvement of laboratory staff. An example of such an automated device is disclosed in WO 2018/007290 A1. This automated device comprises multiple guiding rails to guide a motor driven pipette. The multiple guiding rails optimize the dynamic behavior of the device when automated pipetting is done with high velocity and acceleration of the pipette. The disclosed device comprises a high number of components and consumes a lot of space on the working table.

Therefore, this device is laborious to handle. Additionally, such automated devices, however, are expensive and consume a lot of time for maintenance Also, for nonstandard tests and for handling a smaller number of different liquid samples, such automated devices are not suitable, since reconfiguring these automated devices for such purposes takes longer than doing the pipetting manually.

Therefore, the general need exists in the present technical field to provide a device that improves manual pipetting in view of accuracy and error prevention.

SUMMARY OF THE DISCLOSURE

In one embodiment, the disclosure provides a pipetting support device comprising: at least one first plate comprising at least one row of first vessels; at least one second plate comprising at least one row of second vessels; and at least one moving unit holding said second plate; wherein the moving unit is movable in relation to said first plate and at least partially covers said first plate during use of the pipetting support device; and wherein at least one edge of the moving unit provides guidance to support a manual pipetting procedure between said first plate and said second plate.

In a specific embodiment, the invention contemplates a pipetting support device (1; 1'; 1") comprising:

at least one first plate (11; 11'; 1") comprising at least one row (111*a*, 111*b*, 111*c*; 111*a*', 111*b*', 111*c*'; 111*a*", 111*b*") of first vessels;

at least one second plate (12; 12'; 12") comprising at least one row (121*a*', 121*b*', 121*c*'; 121") of second vessels; and at least one moving unit (13; 13'; 13") holding said second plate (12; 12', 12");

wherein the moving unit (13; 13'; 13") is movable in relation to said first plate (11; 11'; 11") and at least partially covers said first plate (11; 11'; 11") during use of the pipetting support device (1; 1'; 1"); and wherein at least one edge (133; 133'; 133") of the moving unit (13; 13'; 13") provides guidance to support a manual pipetting procedure from said first plate (11; 11'; 11") to said second plate (12; 12'; 12"), or vice versa.

An additional embodiment of the disclosures is a method for pipetting liquid from a first plate containing a number of first vessels to a second plate containing a number of second vessels, or vice versa, the method comprising the steps of placing said first plate under a moving unit of a pipetting support device, such as a pipetting support device according to any one of the embodiments described herein, wherein the moving unit is movable in relation to said first plate and at least partially covers said first plate during use of the pipetting support device, and wherein the moving unit comprises at least one edge for guidance to support a manual pipetting procedure, moving the moving unit in relation to said first plate until said at least one edge of the moving unit indicates a first row of vessels in said first plate, placing said second plate on or into the moving unit, manually pipetting liquid from said indicated row in the first plate to a row of vessels in said second plate, and further moving the moving unit in relation to said first plate until said at least one edge of the moving unit indicates another row of vessels in said first plate, preferably a neighboring row of vessels.

In a specific embodiment, the disclosure provides a method for pipetting liquid from a first plate (11; 11'; 11") containing a number of first vessels to a second plate (12; 12'; 12") containing a number of second vessels, or vice versa, the method comprising the steps of placing said first plate (11; 11'; 11") under a moving unit (13; 13'; 13") of a pipetting support device (1; 1'; 1"), such as a pipetting support device (1; 1'; 1") according to any one of claims 1 to 11, wherein the moving unit (13; 13'; 13") is movable in relation to said first plate (11; 11'; 11") and at least partially covers said first plate (11; 11'; 11") during use of the pipetting support device (1; 1'; 1"), and wherein the moving unit (13; 13'; 13") comprises at least one edge (133; 133'; 133") for guidance to support a manual pipetting procedure, moving the moving unit (13; 13'; 13") in relation to said first plate (11; 11'; 11") until said at least one edge (133; 133'; 133") of the moving unit (13; 13'; 13") indicates a first row (111*a*, 111*b*, 111*c*; 111*a*', 111*b*', 111*c*'; 111*a*", 111*b*") of vessels in said first plate (11; 11'; 11"), placing said second plate (12; 12'; 12") on or into the moving unit (13; 13'; 13"), manually pipetting liquid from said indicated row (111*a*, 111*b*, 111*c*; 111*a*', 111*b*', 111*c*'; 111*a*", 111*b*") in the first plate (11; 11'; 11") to a row (121*a*', 121*b*', 121*c*', 121") of vessels in said second plate (12; 12'; 12"), and further moving the moving unit (13; 13'; 13") in relation to said first plate (11; 11'; 11") until said at least one edge (133; 133'; 133") of the moving unit (13; 13'; 13") indicates another row (111*a*, 111*b*, 111*c*; 111*a*', 111*b*', 111*c*'; 111*a*", 111*b*") of vessels in said first plate (11; 11'; 11"), preferably a neighboring row of vessels.

DETAILED DESCRIPTION

Figure 1:
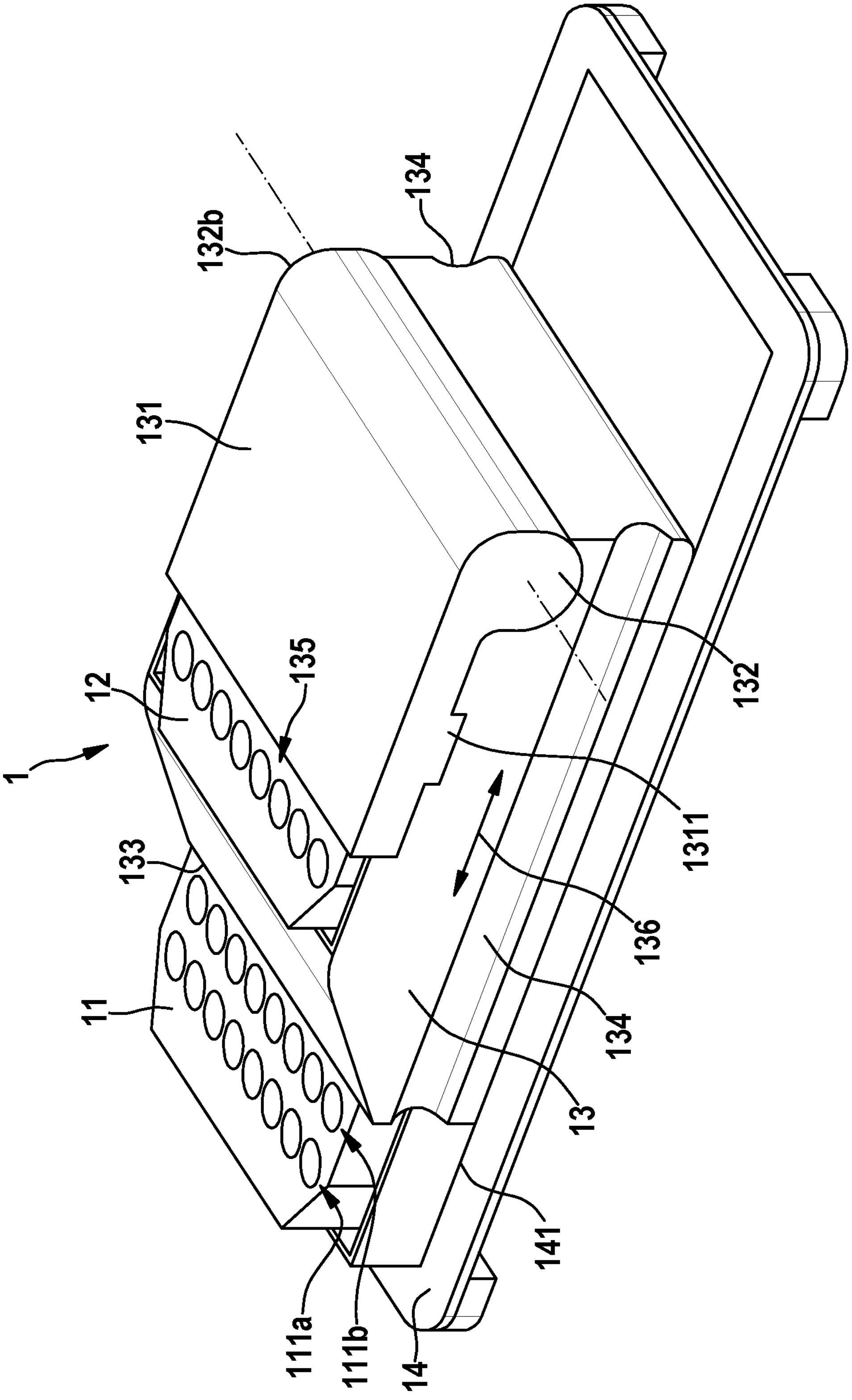
FIG. 1 is a conceptual perspective view of a pipetting support device according to an embodiment of the present disclosure.

The present disclosure addresses the above described problems of the known prior art, and significantly improves the process of manual pipetting of liquid samples. According to a first aspect of the present disclosure, a pipetting support device is provided, which comprises at least one first plate with at least one row of first vessels and at least one second plate with at least one row of second vessels. The pipetting support device according to the present disclosure further comprises at least one moving unit holding the second plate. This moving unit is movable in relation to the first plate and at least partially covers the first plate during use of the pipetting support device. Moreover, at least one edge of the moving unit provides guidance to support a manual pipetting procedure from the first plate to the second plate, or vice versa. An advantage of such a pipetting support device is that it comprises only a small number of components and is easy and cost-effective to manufacture. Such a pipetting support device improves the reliability of the manual pipetting process significantly. In particular, the moving unit provides the advantage that the user of the device, who does the manual pipetting, is guided by an edge of the moving unit to the correct samples that have to be pipetted.

In more detail the pipetting support device according to the present disclosure comprises at least one first plate with at least one row of first vessels. This first plate carries a number of first vessels. The first plate can be a microplate containing multiple vessels permanently connected to each other. Alternatively this first plate can be a kind of rack with multiple openings in it, these openings containing single vessels. Usually these first vessels are source vessels out of which liquid samples are picked up by a pipette guided manually by a user, such as laboratory staff or the like. Therefore the first plate can also be referred to as source plate. Of course these first vessels can also serve as destination vessels into which liquid samples are distributed by a pipette. The first plate is suitable for holding a number of first vessels. The first plate can be shaped in different ways. For example, the first plate can have the shape of a board containing several holes for holding the first vessels. Alternatively, the first plate can also be implemented as a rack made of sheet metal or can be made of wire, in which case the wire-formed the rack contains cavities by design, to hold the first vessels. The first plate can also be a type of microplate.

The first plate comprises at least one row of first vessels. The first vessels are arranged in the shape of at least one row within the first plate. One row is to be understood as a one-dimensional arrangement of the first vessels. The first plate can also contain several rows of first vessels which are placed adjacent to each other in a neighboring manner. In this case, the first plate comprises a two-dimensional arrangement of first vessels. Such a two- or more-dimensional arrangement can also be called an array of vessels.

The pipetting support device according to the present disclosure further comprises at least one second plate comprising at least one row of second vessels. In most cases, these second vessels are destination vessels. In such case, the second plate can also be referred to as destination plate. As already mentioned above for the first plate, the second plate can alternatively also serve as source plate and can contain source vessels. As also described for the first plate above, the second plate can contain one or more rows of second vessels in a similar manner. The second vessels can be arranged within the second plate in a one-dimensional or in a two- or more-dimensional pattern. Also the second plate can be shaped in different ways, similar to the first plate. An easy to produce and, thus, simple embodiment of such a second plate can be a plate in the shape of a board with holes to hold the second vessels. Other shapes providing the possibility to arrange the second vessels in one on more rows are also suitable for a pipetting support device according to the present disclosure, e.g. different types of microplates.

The pipetting support device of the present disclosure further comprises at least one moving unit accommodating the second plate. In this regard, the second plate is placed in or on the moving unit. The pipetting support device according to the present disclosure comprises several parts, wherein the pipetting support device, in an assembled state, can be used for supporting/simplifying pipetting procedures. The pipetting support device can also be disassembled. In the disassembled state, the different parts can be cleaned or disinfected more easily, or single parts can be exchanged in case of damage or failure. When the moving unit is moved, the second plate moves together with the moving unit. The moving unit is movable relative to the first plate. Therefore, the moving unit allows movement of the second plate relative to the first plate. Further, the moving unit at least partially can cover the first plate during the use of the pipetting support device. The moving unit comprises at least one edge directed to the first plate in an assembled state of the pipetting support device. This edge provides guidance for a manual pipetting procedure from the first plate to the second plate or vice versa. As the moving unit at least partially covers the first plate, the edge of the moving unit physically indicates a row of first vessels in the first plate. This indication of one particular row in the first plate makes it easier for the user of the pipetting support device to choose the correct first vessel for picking up or dispensing liquid. Especially in case that the first plate comprises multiple rows of first vessels, the indication helps to avoid mistakes in choosing the correct row for pipetting. The edge of the moving unit is placed above a neighboring row of first vessels in relation to the row that is currently under processing and indicated by the pipetting support device. As the moving unit is movable relative to the first plate, the moving unit can be moved to another or a neighboring row of first vessels after processing the current row of vessels is finished. By moving the moving unit to the next row, the indicating edge of the moving unit is also moved relative to the first plate. During pipetting the moving unit is moved from one row of first vessels to the next row. The edge of the moving unit always indicates the current row of first vessels in the first plate. If the person who performs the pipetting has to interrupt the process and returns later to continue working the edge indicates the row of vessels with which the work has to be continued. A pipetting support device according to the disclosure therefore significantly reduces the risk of choosing the wrong row of first vessels. Thus, the risk of mixing up vessels can be avoided.

The indicating edge of the moving unit can optionally comprise a pointer or the like, which indicates one particular vessel in a row of vessels. For example, such a pointer be implemented by an arrow or marker printed on the surface of the indicating edge of the moving unit. Here, the position of the arrow can provide an indication for a user of a particular vessel in a row, for example in order to give the user an orientation guide as to where manual pipetting should be started, usually at one of the row ends. Starting from this "starting" vessel indicated by the pointer, manual pipetting is continuing until the last vessel in the current row of vessels is processed/pipetted. Further optionally, such a pointer can be implemented as an adjustable pointer, for example movable along the direction of the indicating edge of the moving unit. Such a movable pointer can be moved from one vessel to the next, always indicating the particular vessel in a row of vessels that is currently to be pipetted.

Another advantage of the pipetting support device is that the moving unit covers a part of the first plate and therefore also a part of the number of first vessels. This covering protects the first vessels from contamination. The pipetting support device according to the disclosure is composed of a small number of simple components. Therefore the pipetting support device is simply built, easy to handle and reliable. Furthermore the pipetting support device can be produced economically and is easy to clean or to disinfect. A pipetting support device according to the disclosure is easy to handle and to operate. It takes only a little time to introduce the device to new users. As the moving unit with the second plate containing the second vessels is movable in relation to the first plate with the first vessels, the pipetting distance is reduced. This reduced distance also makes the pipetting process more comfortable and less stressful for the user.

According to a specific embodiment of the present disclosure, the second plate is located above the first plate and is preferably movable by means of the moving unit above the first plate. In this embodiment the second plate containing the second vessels is located vertically above the first plate. This means that at least a part of the moving unit is also located above the first plate. The moving unit together with the second plate is movable above the first plate. This arrangement with the second plate at least partly positioned above the first plate requires less two-dimensional space, for example on top of a table, than arranging a first and a second plate next to each other in the same vertical level. The disclosure uses three-dimensional space to hold and store the first and second plate during pipetting.

According to a further specific embodiment of the present disclosure, the moving unit is slidable above the first plate, preferably slidable in a direction rectangular to the row of vessels in the first plate. According to this embodiment the moving unit spans the first plate in at least one direction. The moving unit is slidable spanning the first plate so that the relative position of the moving unit to the first plate is adaptable during the pipetting process. The first vessels in the first plate are arranged in at least one row. In this row a number of vessels is positioned next to each other or neighboring to each other. The direction of such a row is defined as the direction starting from a first vessel at the one end of the row to the last vessel at the opposite end of the row. During the pipetting process, liquid samples are usually picked up or dispensed following the direction of the row of vessels. The first sample in the row of vessels is usually taken from a vessel at a first end of the row and the last sample is taken from the vessel at the opposite end of this row. In the described embodiment of the disclosure, the moving unit is slidable in a direction rectangular to the direction of the row of vessels. For the case that the first plate contains more than one row of vessels, such a movability of the moving unit rectangular to the rows of vessels gives the possibility to slide the moving unit in the same pattern as the distances between the rows of vessels in the first plate.

In other words, the moving unit is first placed above the first plate indicating a first row of first vessels with its indicating edge. In this state pipetting is done picking up or dispensing liquid out of or into the vessels of the first row. In this state the edge of the moving unit indicates the user the correct row of vessels while other rows of the first plate are covered by the moving unit. After finishing pipetting in the first row of first vessels, the moving unit is moved rectangular to the first already pipetted row of vessels until the neighboring row of vessels is visible and accessible for pipetting. In this state the moving of the moving unit is stopped. Afterwards pipetting is continued wherein the indicating edge of the moving unit now indicates a second row of first vessels that has to be pipetted. These steps of pipetting a row or vessels and moving the moving unit to indicate the next row of vessels can be repeated for every row of vessels in the first plate. In another specific embodiment of the disclosure the first plate is shaped circularly. Within this circle-shaped first plate, the first vessels are arranged in concentric circles, like beams starting from the center of the plate towards the outside. In this embodiment, the moving unit is hinged in the center of the circle-shaped first plate and is movable circumferentially around the center point of the first plate. In this embodiment the moving unit is also slidable, but different to the embodiment described before, slidable circularly. In both embodiments the moving unit is movable in a direction rectangular to the direction of the particular row of first vessels in the first plate.

According to a further specific embodiment of the present disclosure, the at least one edge of the moving unit is a straight edge for indicating one row of vessels of the first plate, in particular during pipetting. In this embodiment the indicating edge of the moving unit is straight. This shape is best suitable for indicating a straight line of first vessels in the first plate. In most cases the first vessels are arranged in straight lines, as such an arrangement allows a high packing density of vessels and is easy to handle for the user. The at least one indicating edge of the moving unit is shaped in the way that it fits to the pattern in which the first vessels are arranged on the first plate. In this way the indicating edge gives an optimal optical guideline for the user. Of course the indicating edge of the moving unit can also be shaped in a different way that fits to a row of vessels in the first plate. For example the first vessels can also be arranged with offset between each neighboring vessel. In this way, the vessels are not arranged in the shape of a straight line but in the shape of a zigzag line. In this way the packing density of vessels in the first plate can be further increased. For such an arrangement, the indicating edge of the moving unit is also formed in a zigzag shape matching the shape of the arrangement of the first vessels. For optimal indicating a row of vessels that has to be pipetted, the shape of an indicating edge of the moving unit is designed matching the shape of the arrangement of the vessels in the first plate. In this way the distance between the indicating edge and the indicated row of vessels is always constant.

According to a further specific embodiment of the present disclosure, the moving unit has the shape of a sledge and comprises skids that are arranged essentially rectangular in regard to the at least one edge of the moving unit. In this embodiment the moving unit comprises two skids that are arranged neighboring to a holding area that holds the second plate. The skids protrude over the holding area. Between the skids and the holding area is space for the first plate of vessels, which is at least partially covered by the moving unit. The moving unit is slidable on the skids and movable above the first plate. In the assembled state of the pipetting support device, the skids are positioned next to the borders of the first plate. In this way, the moving unit at least partially encloses the first plate. So the first plate is protected against contamination by the moving unit. The skids define planes with their biggest surfaces. These planes, defined by the skids, are arranged rectangular to a plane defined by the holding area that holds the second plate. The planes defined by the skids are also arranged rectangular to the indicating edge of the moving unit. With this geometrical arrangement of skids, holding area and indicating edge of the moving unit the part of the first plate of vessels, which is beneath the moving unit, is optimally enclosed and protected against contamination wherein at the same time the row of vessels in the first plate that is currently to be pipetted, is positioned in a small distance to the second plate. This small distance makes pipetting easy for the user and reduces the risk of mistakes during pipetting.

According to a further specific embodiment of the present disclosure, the distance between the skids is adaptable, in particular wherein the distance between the skids is adaptable to the dimensions of the first plate. In this embodiment of the device the moving unit is geometrically adaptable to the first plate of vessels. Especially the distance between two skids, that enclose the first plate in the assembled state of the pipetting support device, can be adjusted depending on the dimensions of the first plate. In laboratories, holders for vessels that contain liquid samples exist in different shapes and dimensions. An adaptability of the moving unit according to the shape and dimension of the vessel holding first plate that is currently used for pipetting makes the device much more flexible for the user. Before pipetting, the user adapts the distance between the skids to the first plate of vessels. This adapting brings optimal protection against contamination of the vessels in the first plate because the covering provided by skids and holding area of the moving unit is optimized. At the same time the adapted skids are placed next to the first plate and so are guided by the borders of the first plate during sliding. Thus, an accurate movement of the moving unit in regard to the first plate of vessels can be achieved. This accurate movement causes a clear and accurate indicating of the row to be pipetted in the first plate by the indicating edge. Such an adaptability of the distance between the skids can, for example, be realized by linear guides that are arranged at the bottom of the holding area and positioned rectangular to the skids. In this example, the skids are slidable within the guides rectangular to the indicating edge of the moving unit. Of course, an adaptability of the distance between the skids can also be realized by other technical features. Such another technical feature could be a combination of holes in the bottom of the holding area of the moving unit and elements at the skids, which have a negative geometry to these holes. The skids can, for example, comprise bolts or pins that are orientated parallel to the skids. These bolts or pins can be plugged into the holes in the bottom of the holding area. By choosing different holes for plugging the bolts or pins the distance between the skids is made adaptable.

According to a further specific embodiment of the present disclosure, the first plate and the moving unit containing the second plate are mutually arranged on a baseplate. In this embodiment of the pipetting support device the components of the device are arranged on a baseplate. The first plate containing the first vessels and the moving unit are placed on this baseplate. Thus, the baseplate can be considered as a common basis for the other elements of the device. By means of the baseplate, the first plate of vessels is additionally protected against contamination.

Furthermore, such a baseplate can be made of smooth material, so that the moving unit is easily slidable on top of the baseplate. That makes handling the device very easy for the user. Additionally, the baseplate can provide guidance for moving the moving unit. For example, the baseplate can provide edges or rails that geometrically correspond to the skids of the moving unit. In this embodiment the skids are guided by the edges or rails and so can be moved smoothly on top of the baseplate. Another advantage of a baseplate can be found in the fact that the whole pipetting support device can be carried to another place in one working step. For example, the whole pipetting support device can be brought to another laboratory room and the user has only to touch the baseplate. The baseplate can also provide mechanisms to fix the first plate on top of it to prevent that the first plate gets out of place. These mechanisms can for example be clamps that are arranged elastically on top of the baseplate. The first plate can be easily put between two or more of such clamps without the need of any tools. Providing a baseplate brings some advantages as described above. However, a pipetting support device according to the disclosure is also functional without a baseplate, e.g. the first plate and the moving unit can be placed directly on a working table. Without using a base plate, the number of components of the pipetting support device is reduced.

According to a further specific embodiment of the present disclosure, the baseplate fixes the first plate, and the moving unit is movable in relation to the baseplate and the fixed first plate. In this embodiment of the pipetting support device, the baseplate is provided to fix the first plate on it or in it. Especially in case the first plate is a microplate, its weight can be very low. Such a first plate exhibiting low weight can be in danger of accidentally slipping during pipetting. In case the first plate or a vessel therein is touched by the tip of the pipette, the pipette can transfer a momentum to the plate and, thus, cause it to slip. Since, after slipping, the first plate has taken another position in relation to the other parts of the pipetting support device, there is the risk of mistakes in choosing a wrong vessel for the next pipetting step. Now, in order to prevent such mistakes, the first plate is fixed to the baseplate and, therefore, cannot slip accidentally. For example, the fixing of the first plate in relation to the baseplate can be done by formfit engagement or the like. Here, the baseplate can comprise a recess formed as a geometric negative to the first plate. In order to fix the first plate, the same can be arranged into such formfit recess. Another possibility to fix the first plate in relation to the baseplate is to provide a clamping device or the like. Such a clamping device can fixate the first plate via force closure and/or formfit. Still, the moving unit is movable in relation to the baseplate and to the first plate fixed on the baseplate. Preferably the baseplate guides the movement of the moving unit in relation to the fixed first plate.

According to another specific embodiment of the present disclosure, the baseplate comprises means against slipping in relation to a base, onto which the pipetting support device can be placed on, wherein the baseplate comprises a loading to increase its weight and/or the baseplate comprises a sticking lamination at its underside. Since the baseplate is provided to prevent the first plate from accidentally slipping, the baseplate itself must also not slip in relation to a base onto which it is placed on. Such base can be a table or workbench or the like. Here, a simple solution in order to prevent the baseplate from slipping in relation to its base is to increase the weight of the baseplate. For example, this can be realized by an additional loading placed on or within the baseplate. Another possibility is to use a particular material for the baseplate, which material exhibits high density and great weight. For example, the baseplate can be made of iron or steel. Alternatively or additionally, the baseplate can comprise a sticking lamination at its underside, in order to increase friction or adhesion between the baseplate and a base it is placed on.

According to a further specific embodiment of the present disclosure, the moving unit comprises a cover at least partially covering the second plate. In this embodiment the moving unit is protected by a cover that is positioned in a way that it covers at least a part of the second plate. This cover serves as protection for the second vessels in the second plate against contamination. This cover is movable in relation to the other parts of the moving unit. This movability is necessary to bring in or take out the second plate. For example the cover can be connected to the rest of the moving unit by hinges. Another solution for connecting the cover with the rest of the moving unit can be provided by guiding rails between the components. Thereby, the cover can be pivotable or slidable in relation to the other parts of the moving unit. For changing the second plate in the moving unit, the cover is moved away from the other parts of the moving unit. After placing a second plate in or on the moving unit, the cover is closed by the user and then protects the vessels in the second place against contamination.

According to a further specific embodiment of the present disclosure, the cover comprises at least one edge providing guidance to support a manual pipetting procedure from or to the second plate. In this embodiment the pipetting support device comprises another, additional edge located at the cover of the moving unit to support or guide the pipetting process, wherein the edge of the moving unit, which is located at the bottom of the moving unit to guide pipetting from or into a row of first vessels in the first plate beneath the moving unit, the edge of the cover of the moving unit guides pipetting from or into a row of seconds vessels in the second plate, which is located within or on the moving unit. This embodiment has advantages in the case that the second plate comprises two or more rows of vessels. The indicating edge at the cover helps the user to remember a row of second vessels in the second which is to be pipetted. The edge of the cover, that provides guidance during pipetting, can be used in the same way as described above for the indicating edge, indicating a row of first vessels in the first plate. In this embodiment the risk of mixing up vessels in the second plate during pipetting is further reduced.

According to another specific embodiment of the present disclosure, the cover is sildeable or pivotable in relation to the second plate. In this embodiment the cover is movable relative to the other parts of the moving unit. The cover can, for example, be connected to the other parts of the moving unit by hinges so that is pivotable around these hinges. The cover can be opened and closed around these hinges. Here, the cover can be opened to bring in or take out the second plate. After placing a second plate within or on the moving unit, the cover is folded into the closed position and then protects at least a part of the vessels in the second plate against contamination. In this embodiment the cover also comprises an edge to indicate a particular row of second vessels within the second plate. Furthermore, the cover can be designed in a way that it is slidable in relation to the other parts of the moving unit and in relation to the second plate. A cover designed in this way can be moved linearly in relation to the second plate. Such a linear movability results in that an indicating edge of the cover can be moved together with the cover to guide the user to remember the actual row of second vessels in the second plate, which has to be pipetted. During pipetting, when pipetting of one row of vessels in the second plate is finished, the slidable cover is moved to the next row of second vessels while the indicating edge indicates the current row that has to be pipetted. The slidable cover protects at least a part of the second vessels within the second plate against contamination. The cover can also be designed in the way that it is both pivotable and slidable in relation to the second plate. Such an embodiment can be realized with hinges that hold the cover and at the same time are linearly movable in relation to the other parts of the moving unit. Such a cover can comfortably be folded to load or unload a second plate in the moving unit. The slidability additionally allows using an edge of the cover as movable guidance to indicate a row of second vessels.

According to a second aspect of the present disclosure, the use of a pipetting support device according to any one of the embodiments as described above is provided as a support for manually pipetting liquid from a first plate comprising first vessels to a second plate comprising second vessels, or vice versa. According to the disclosure, a pipetting support device is used to simplify manual pipetting from the first plate of vessels to a second plate of vessels. By the use of such a pipetting support device the process of pipetting becomes more reliable and the risk of mixing up vessels, source vessels as well as destination vessels is significantly reduced.

According to a specific embodiment of the use according the present disclosure, liquid from a first vessel in one row of the first plate is collected by a pipette, with the one row of the first plate being indicated by an edge of the moving unit. Further, the collected liquid is transferred to a vessel in one row of the second plate, with the one row of the first plate being indicated by an edge of a cover of the moving unit, and the distance between the one row of vessels in the first plate and the one row of vessels in the second plate remains constant. In this embodiment of use, an edge of the moving unit is used as an indicator to indicate a row of a first plate of vessels during pipetting. Such indication makes it easier for the user to remember which vessels are actually to be pipetted. The edge used for indicating is located at a border or a boundary of the moving unit of a pipetting support device. The inventive use results in the fact that mistakes in pipetting accidently a wrong sample out of or into a vessel can be avoided. Here, the first vessel can either be a source vessel or a destination vessel. The pipetting support device is further used to also indicate the current row of vessels in the second plate of vessels which is placed in the moving unit. For indicating that row of second vessels, an edge of the cover of the moving unit is used. Thus, the risk of accidentally pipetting a wrong vessel in a wrong row in the second plate is reduced by the use of the pipetting support device. Similar to the vessels in the first plate, the vessels in the second plate can either be source vessel or destination vessel. By use of the pipetting support device with its movable moving unit, the distance between the row of first vessels and the row of second vessels that are currently to be pipetted, remains at least essentially constant. This constant distance between source vessel and destination vessel reduces stress and strain for the user. Using a pipetting support device, therefore, makes manual pipetting more economic. At the same time, costs and effort to install such a device are low.

According to a third aspect of the present disclosure, a method for pipetting liquid from a first plate containing a number of first vessels to a second plate containing a number of second vessels, or vice versa, is provided. The method comprises the steps of placing the first plate under a moving unit of a pipetting support device, such as a pipetting support according to any of the embodiments described above, wherein the moving unit is movable in relation to the first plate and at least partially covers the first plate during use of the pipetting support device, and wherein the moving unit comprises at least one edge for guidance to support a manual pipetting procedure. In a second step, the moving unit is moved the in relation to the first plate until the at least one edge of the moving unit indicates a first row of vessels in the first plate. In the next step, the second plate is placed on or into the moving unit. Afterwards, liquid is manually pipetted from the indicated row in the first plate to a row of vessels in the second plate. After finishing pipetting of the first row of vessels, the moving unit is further moved in relation to the first plate until the at least one edge of the moving unit indicates another row of vessels in the first plate, preferably a neighboring row of vessels. A method according to the disclosure is destined to pipette liquid samples from first plate containing first vessels to a second plate containing second vessels. Both plates can contain either source vessels or destination vessels. The method is preferably executed exactly in the sequence as described in the following; however, certain steps can be repeated or alternated. In the first step of the method, the first plate is placed beneath a moving unit of the pipetting support device. The moving unit is movable, preferably slidable, in relation to the first plate. The moving unit at least covers a part of the vessels when placed above the first plate. The moving unit comprises at least one edge to indicate one particular row of vessels in the first plate. The indicating edge is directed in direction to the first plate in the assembled state of the pipetting support device. During pipetting the first row of vessels in the first plate, the indicating edge is used to guide a user to the row of vessels to be pipetted. To ensure that the indicating edge marks the correct row of vessels to be pipetted, the moving unit is moved in relation to the first plate until the indicating edge is positioned next to the row of vessels to be pipetted. The row to be pipetted is the row of vessels which is positioned next to the indicating edge. After this positioning of the moving unit, a second plate of vessels is placed on or within the moving unit. In one embodiment of the disclosure, the second plate only contains one row of second vessels. After these steps of positioning the moving unit in relation to the first plate and assembling the second plate into the device, manual pipetting takes place. After finishing pipetting of the first row of vessels in the first plate, the moving unit is moved further, in relation to the first plate, until the indicating edge indicates another row of vessels, preferably the neighboring row of the first row of vessels. After such movement of the moving unit, pipetting of the next or neighboring row can take place, and so on.

According to a specific embodiment of the method according the present disclosure, the method further comprises the steps of replacing the second plate by a third plate after the step of further moving the moving unit and before pipetting liquid from the next neighboring row of vessels in the first plate. After such replacement, liquid from the indicated neighboring row in the first plate to a row of vessels in the third plate is manually pipetted by the user. This sequence of steps can be repeated until all targeted liquid from the first plate has been pipetted. In this embodiment of the inventive method, the plate in or on the moving unit is replaced after pipetting one row of first vessels in the first plate. In case the moving unit comprises a cover, such cover is to be opened before removing the second plate of vessels from the moving unit. After replacing the second plate by a third, fourth or further plate, the cover is closed again to protect the plate in or on the moving unit against contamination and the like. In this embodiment of the method, the plates on or in the moving unit contain only one row of vessels. The user doing the pipetting can usually be easily distracted by changing these plates. Thus, without using the pipetting support device of the present disclosure, the risk of accidently pipetting a wrong row of first vessels in the first plate after the process of changing the second plate can be high. Here, since the indicating edge of the moving unit of the pipetting support device of the present disclosure always indicates the next correct row of vessels in the first plate, such mistakes in choosing wrong vessels in the first plate can be fully avoided.

According to a further specific embodiment of the method according the present disclosure, the moving unit comprises a moving unit cover at least partially covering the second plate and being movable above the second plate. The moving unit cover comprises at least one edge providing guidance to support a manual pipetting procedure. Thus, the method can further comprise the steps of moving the moving unit cover until the at least one edge indicates a second row of vessels in the second plate. Afterwards, liquid from the indicated row of vessels in the first plate is manually pipetted to the indicated row of vessels in the second plate. The described steps can be repeated until all targeted liquid from the first plate is pipetted to the second plate. In this embodiment of the inventive method, both plates, source plate and destination plate, comprise multiple rows of vessels. For pipetting between two plates with multiple rows of vessels, a pipetting support device can be used, which comprises a cover movable in relation to the second plate placed in or on the moving unit. Such cover of the moving unit comprises at least one indicating edge to indicate a particular row of vessels in the second plate. The indicating edge indicates optically which row of vessels in the second plate is currently to be pipetted. Before starting the manual pipetting, the moving unit with its indicating edge is moved in relation to the first plate until the indicating edge indicates the row of first vessels to be pipetted as described above. Afterwards, the movable cover of the moving unit is moved in relation to the second plate until its indicating edge indicates the row of second vessels in the second plate which is currently to be pipetted. Thereafter, the two rows between which the pipetting shall take place are clearly indicated by the two indicating edges. After this preparation step, manual pipetting takes place between the two indicated rows. Then, after pipetting these rows, both the whole moving unit and the moveable cover of the moving unit are moved further, in order to indicate the next, neighboring rows of vessels in the first and the second plate. For pipetting the other remaining rows of vessels in the two plates, the previously described steps must be repeated until all samples are pipetted.

As used herein and also in the appended claims, the singular forms “a”, “an”, and “the” include plural reference unless the context clearly dictates otherwise. Similarly, the words “comprise”, “contain” and “encompass” are to be interpreted inclusively rather than exclusively; that is to say, in the sense of “including, but not limited to”. Similarly, the word “or” is intended to include “and” unless the context clearly indicates otherwise. The terms “plurality”, “multiple” or “multitude” refer to two or more, i.e. 2 or >2, with integer multiples, wherein the terms “single” or “sole” refer to one, i.e. =1. Furthermore, the term “at least one” is to be understood as one or more, i.e. 1 or >1, also with integer multiples. Accordingly, words using the singular or plural number also include the plural and singular number, respectively. Additionally, the words “herein,” “above,”, “previously” and “below” and words of similar import, when used in this application, shall refer to this application as a whole and not to any particular portions of the application.

Furthermore, certain terms are used for reasons of convenience and are not intended to limit the disclosure. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

The following examples are intended to illustrate various specific embodiments of the present disclosure. As such, the specific modifications as discussed hereinafter are not to be construed as limitations on the scope of the present disclosure. It will be apparent to the person skilled in the art that various equivalents, changes, and modifications may be made without departing from the scope of the present disclosure, and it is thus to be understood that such equivalent embodiments are to be included herein. Further aspects and advantages of the present disclosure will become apparent from the following description of particular embodiments illustrated in the figures.

Reference(s) to "embodiment(s)" throughout the description which are not under the scope of the appended claims merely represent possible exemplary executions and are therefore not part of the present disclosure.

EXAMPLES

FIG. 1 shows a conceptual perspective view of a pipetting support device 1 according to an embodiment of the present disclosure, with a first plate 11 comprising a plurality of vessels in its upper side surface, and a second plate 12 comprising a plurality of vessels in its upper side surface, wherein the second plate 12 only comprises one row 121 of vessels, whereas the first plate 11 can comprise more than one row 111 of vessels. Both the first plate 11 and the second plate 12, illustrated in FIG. 1, are designed as microplates. These microplates 11, 12 are flat plates containing multiple vessels permanently connected to each other, and liquid samples can be stored directly within the vessels of the microplates 11, 12, which means that the samples have to be pipetted directly into or out of the vessels of the respective microplate 11, 12. Alternatively, the first plate 11 and/or the second plate 12 can comprise openings or recesses designed to receive single separate vessels such as Eppis. In such alternative embodiment of the first plate 11 and the second plate 12, the plates 11, 12 serve as holders for the sample containing vessels to be pipetted. In the embodiment as shown in FIG. 1, the pipetting support device 1 is shown in its entirety, wherein the first plate 11 is illustrated on the left-hand side of the pipetting support device 1. This first plate 11 comprises multiple rows 111*a*, 111*b*, . . . of first vessels. The first plate 11 in this embodiment is shaped like a microplate with the first vessels arranged next to each other. The first vessels in the first plate 11 are arranged in an array comprising multiple rows 111*a*, 111*b*, . . . in a two-dimensional pattern. Two rows 111*a* and 111*b* are visible in FIG. 1, whereas more rows can be hidden under a moving unit 13 of the pipetting support device 1.

The moving unit 13 is positioned in FIG. 1 on the right-hand side with respect to the first plate 11. As can be gathered therefrom, the moving unit 13 partially covers the first plate 11. The moving unit 13 carries a second plate 12 of vessels inside its upper part. A part of the moving unit 13 and a part of the second plate 12 are covered by a foldable cover 131 of the moving unit 13. A foldable cover 131 is connected pivotably to the other parts of the moving unit 13, combined also referred to as main body of the moving unit 13, by means of hinges 132*a* and 132*b*. Here, the main body of the moving unit 13 comprises the holding area 135 and the two skids 134. The foldable cover 131 in a closed state, as shown in FIG. 1, provides access to the one and only row 121 of second vessels in the second plate 12.

The cover 131 comprises a handle 1311 which is arranged at a lateral edge of the cover 131. The handle 1311 is orientated in a direction towards the viewer in FIG. 1. A user of the pipetting support device 1 can use the handle 1311 to open and close the cover 131. The lateral edges of cover 131 respectively overlap and enclose the holding area 135 in the main body of the moving unit 13. The lateral edges of the cover 131 also overlap and enclose the hinges 132*a*, 132*b*. These overlapping lateral edges of the cover 131 result in that liquid which is e.g. accidentally lost or intentionally dropped during pipetting can unobstructedly run off the cover 131 and away from the pipetting area. Thereby, it can also be prevented that such "lost" liquid infiltrates the hinges 132*a* and 132*b*. In further detail, the cover 131 does not comprise any sharp edges, or also recesses in which liquid can accumulate. Such "streamlined" design of the cover 131 also provides for easy cleanability by the user. Only the handle 1311 protrudes from the cover 131 and is, thus, easily accessible for the user curing pipetting. FIG. 1 furthermore shows the assembled state of the pipetting support device 1. In this assembled state, the pipetting support device 1 is ready to support a user with manual pipetting, either when pipetting from the first vessels in the first plate 11 to the second vessels in the second plate 12, or vice versa. In the assembled state, as shown in FIG. 1, the moving unit 13 is positioned above the first plate 11 and is provided in a slidable manner in relation to this first plate 11. The moving unit 13 comprises a straight edge 133 on its end directed towards the first plate 11. In the embodiment as illustrated in FIG. 1, this straight edge 133 serves as an indicating edge 133 of the moving unit 13. The straight edge 133 physically indicates the row of first vessels in the first plate 11, which row is currently to be pipetted by the user. In the state as shown in FIG. 1, the straight edge 133 already passed the first row 111*a*, i.e. this row has already been processed, and presently indicates the second row 111*b* of first vessels in the first plate 11 as the row to be processed/pipetted currently. Here, the straight edge 133 is positioned on the right side of the second row 111*b*. The neighboring third row 111*c* of vessels (not shown) is still covered by the moving unit 13 and, therefore, is not yet accessible to the user. Thus, the user can not be tempted to confuse the second row 111*b* and the third row 111*c* during pipetting. The straight edge 133 particularly guides the user to only use the presently accessible second row 111*b* for the current pipetting process.

In general, when using the pipetting support device 1 according to the present disclosure, pipetting is usually started with the first row 111*a* in the first plate 11. After pipetting the first row 111*a*, the moving unit 13 is moved by the user in a way such that the second row 111*b* can be fully accessed, and pipetting is continued with the now accessible second row 111*b*. Since the vessels in the first row 111*a* are already emptied from samples or, alternatively, filled with samples, depending on the pipetting task, the user can be sure that pipetting of the first row 111*a* is already finished, since the same has been moved away from the indicating straight edge 133. Further, since the next, third row 111*c* is still hidden behind/under the moving unit 13, the currently indicated row which can be pipetted by access is the second row 111*b* next to the straight edge 133. Therefore the pipetting support device 1 is in the position to clearly and doubtlessly indicate for the user the current row to be pipetted, which indication significantly reduces or even completely eliminates mistakes during pipetting by choosing the wrong vessel or row of vessels.

Further, the region of the moving unit 13 which extends between the straight edge 133 and the second plate 12 is formed like a chamfer which inclines upwards between the straight edge 133 and the second plate 12. The chamfer allows an unobstructed move of the tip of the pipette from the first plate 11 to the second plate 12, thereby reducing the risk of contamination of the sample within the pipette. Also, the distance between a source vessel and a respective destination vessel is constantly kept short with the pipetting support device 1 according to the present disclosure, and there are no sharp edges between the two vessels, which edged could accidentally collide with the pipette or its tip during pipetting. Moreover, the holding area 135 of the moving unit 13 comprises a recess to receive the second plate 12. In the embodiment as illustrated in FIG. 1, fiducial markers 137 are placed next to the recess that contains the second plate 12. These fiducial markers 137 label the individual second vessels in the second plate 12, for example by numbers or letters, in order to further ease the identification of each vessel for the user. Thus, the fiducial markers 137 assist the user of the pipetting support device 1 to address a particular vessel within the row of second vessels. Of course, also the first vessels in the first plate 11 can be labeled with such fiducial markers, if desired.

In the embodiment as shown in FIG. 1, the moving unit 13 has the shape and function of a sledge and, thus, comprises two skids 134. These two skids 134 connect to a holding area 135 of the moving unit 13. The holding area 135 is positioned in the middle of the moving unit 13 and is adapted to carry the second plate 12. The holding area 135 also covers a part of the first plate 11. In further detail, the holding area 135 defines a plane orientated horizontally in the assembled state of the pipetting support device 1. The two skids 134 protrude from a lower surface of the holding area 135 downwards on each side, i.e. opposite of the side on which the second plate 12 is positioned. The two skids 134 themselves respectively define a plane orientated rectangular to the horizontal plane as defined by the holding area 135, i.e. the skids 134 and the holding area 135 define a right-angled structure, wherein the skids 134 and the holding area 135 define their respective planes by their largest surface. Of course, these planes only exist in theory and assist in explaining the orientation of skids 134, holding area 135 and indicating edge 133 in relation to each other.

With the orientation of the protruding skids 134 in a rectangular manner relative to the holding area 135, empty space exists between the skids 134, which empty space can be used to receive the first plate 11 between the skids 134. The moving unit 13 is slidable on the skids 134 and, thus, is slidable above the first plate 11. The direction of slidability of the moving unit 13 is indicated in FIG. 1 by a double arrow 136. The indicating edge 133 is positioned rectangular to the skids 134, i.e. rectangular to the planes as defined by the skids 134. During moving the moving unit 13 in relation to the fixated first plate 11, the skids 134 serve as guides sliding along the lateral edges of the first plate 11. During moving of the moving unit 13, the skids 134 move parallel to these lateral edges of the first plate 11. Since the straight edge 133 is orientated rectangular to the skids 134, the straight edge 133 is always orientated parallel to the direction of the rows 111*a*, 111*b* of vessels. To provide an adaptability of the moving unit 13 to the dimensions of differently sized first plates 11, it can also be an option to design the pipetting support device 1 in a way such that the distance between the two skids 134 is adaptable, for example by means of an adjusting mechanism below the main body of the moving unit 13, such as a tongue-and-groove connection or the like. Such an adaptability, however, is only optional and, thus, is not shown in FIG. 1.

In the embodiment as shown in FIG. 1, the first plate 11 and the moving unit 13 are arranged on a further component of the pipetting support device 1 in the form of a baseplate 14. This baseplate 14 can receive the other components of the pipetting support device 1. The baseplate 14 comprises a circumferential rim 141 in a quadrangular manner. Two lateral sides of this circumferential rim 141 guide the inner sides of the skids 134 of the moving unit 13, which inner sides are orientated opposite to the second plate 12 during moving of the moving unit 13. By this guidance provided by the circumferential rim 141, the moving unit 13 can be moved accurately parallel to the lateral edges of the first plate 11. This guidance also ensures that the indicating edge 133 is always orientated parallel to the rows 111*a*, 111*b*, . . . of vessels in the first plate 11.

In the embodiment as shown in FIG. 1, the moving unit 13 and the baseplate 14 are made of plastic material and manufactured in a process of injection molding. Accordingly, these components are cost-effective to manufacture and have a light weight so that they are easy to handle by the user. Of course, the complete pipetting support device 1, or alternatively only some of its components, can also be made of other materials suitable for laboratory use.

Figure 2:
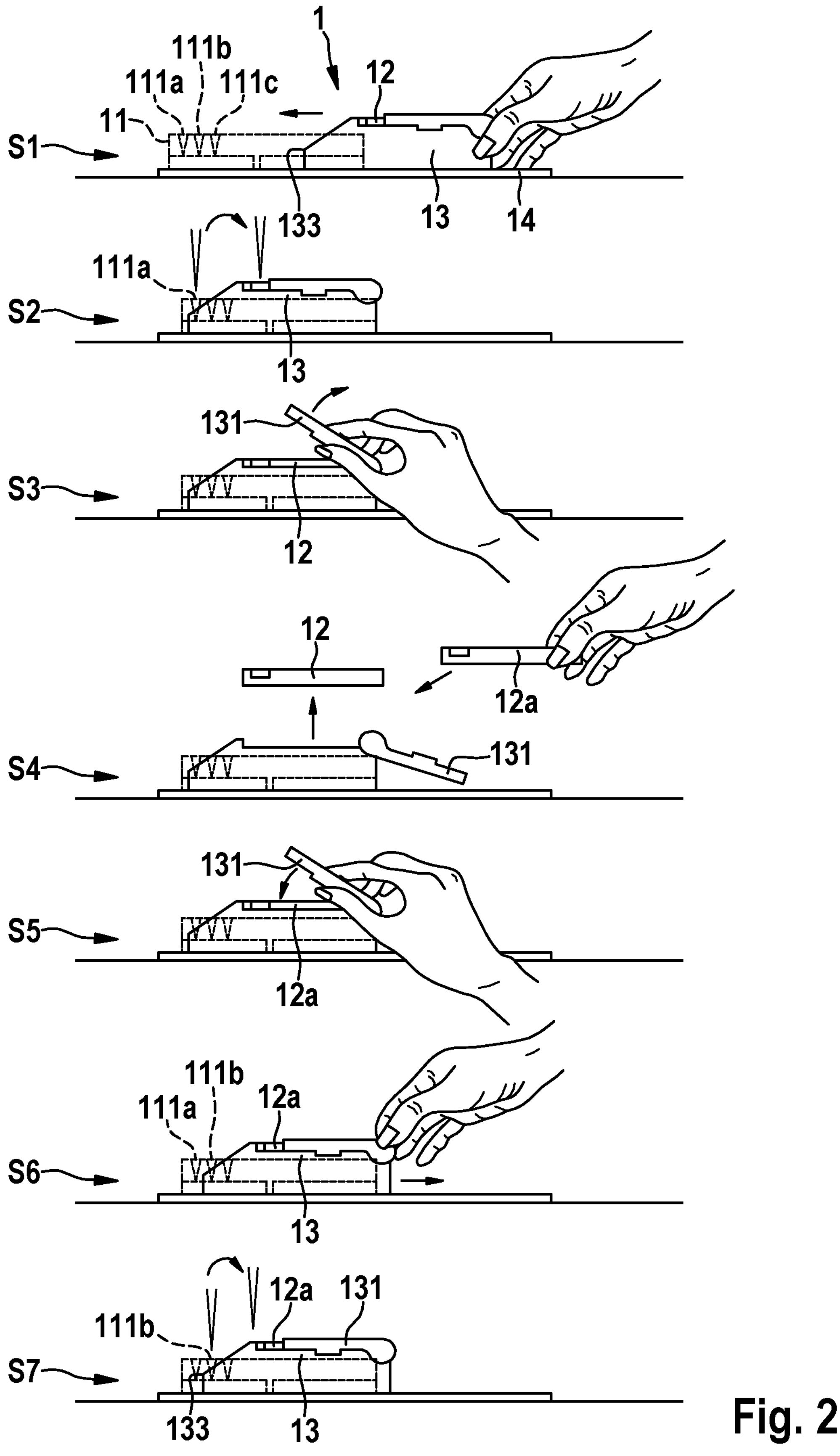
FIG. 2 is a schematic illustration of different steps of a method according to an embodiment of the present disclosure by means of the pipetting support device as illustrated in FIG. 1.

FIG. 2 shows a schematic illustration of different steps of a method according to an embodiment of the present disclosure, with the use of the pipetting support device 1 as illustrated in FIG. 1. In FIG. 2, the different steps of the method are illustrated in sequentially arranged pictures from top to bottom. The first step of the method is illustrated in the uppermost picture and is indicated as step S1. The second step of the method is illustrated in the picture beneath the uppermost picture and is indicated as step S2. The following steps are respectively illustrated in the pictures from top to bottom, while each following step is indicated as step S3, S4, . . . and so on. The method can be executed in the illustrated sequence S1, S2, . . . from top to bottom. In step S1, a pipetting support device 1 according to the embodiment shown in FIG. 1, is prepared for manual pipetting. A first plate 11 is placed on the baseplate 14 of the pipetting support device 1. The first plate 11 is formed as a microplate in the illustrated embodiment. Here, the first plate 11 is positioned on the left-hand side of the base plate 14. A second plate 12, also formed as a microplate, is positioned within the moving unit 13. The moving unit 13 is positioned on the right-hand side of the first plate 11 in step S1. Starting from the position illustrated in step S1 and proceeding to step S2, the moving unit 13 is moved to the left side, as indicated by an arrow, towards the first plate 11. More particular, the moving unit 13 is moved over the first plate 11 until the straight edge 133 of the moving unit 13 indicates the most left, first row 111*a* of vessels in the first plate 11.

Movement of the moving unit 13 is stopped as soon as the first row 111*a* is clearly indicated by the straight edge 133. This state, i.e. when preparing the pipetting support device 1 is finished, is shown in step S2. In step S2, all the rows of vessels in the first plate 11 but the row 111*a* are covered by the moving unit and, thus, are not accessible to the user for pipetting. In step S2, samples from the source vessels in row 111*a* in the first plate 11 are manually pipetted into the only row of destinations vessels in the second plate 12, as indicated by the arrow in the illustration of step 2. In step S2 manual pipetting is continued until all samples are pipetted from row 111*a* into the second plate 12. Of course, in an alternative embodiment of the method, the samples can also be taken out of source vessels in the second plate 12 and be pipetted into destination vessels in the first plate 11.

After finishing this pipetting of row 111*a*, the method continues to step S3. In step S3 the foldable cover 131 of the moving unit 13 is opened manually by the user. After opening the cover 131, the second plate 12 is accessible and can be removed from the moving unit 13.

In step S4 the second plate 12 in the moving unit 13 is manually replaced by a third plate 12*a*. The third plate 12*a* is similar to the second plate 12, i.e. formed as a microplate, and both the second plate 12 and the third plate 12*a* contain only one single row of vessels. The removed second plate 12 now, after pipetting, contains samples within its vessels. Thus, for the second plate 12, pipetting is finished, and the second plate 12 can be transferred to other laboratory equipment or the like, which is not illustrated.

In step S5, the foldable cover 131 of the moving unit is manually closed by the user. After closing, the third plate 12*a* is protected within the moving unit 13 by the cover 131.

In step S6, the moving unit 13 with the incorporated third plate 12*a* is moved to the right side in the illustration, until the straight edge 133 of the moving unit 13 indicates the second row 111*b* in the first plate 11. The moving unit 13 is moved to the right side manually over a certain distance which corresponds to the distance between the rows 111*a* and 111*b*. After finishing step S6, the straight edge 133 indicates the next row 111*b* to be pipetted. The other rows arranged on the right side of row 111*b*, for example row 111*c*, are covered by the moving unit 13 and, thus, are not accessible for pipetting.

In step S7, manual pipetting takes place between source vessels in row 111*b* and destination vessels in the third plate 12*a*. During pipetting, the straight edge 133 of the moving unit clearly indicates row 111*b* as the particular row of source vessels that is currently to be pipetted. After finishing step S7, the third plate 12*a* in the moving unit 13 can be replaced by a fourth plate, analog to the replacement of the second plate 12 by the third plate 12*a*, as shown and described in steps S3 to S5.

After replacing the plates in the moving unit 13, the moving unit 13 is again moved to the right side until its straight edge indicates the next row 111*c* to be pipetted. The steps S1 to S7 can be repeated until all vessels in the first plate 11 have been pipetted. After finishing pipetting of the first plate 11, the moving unit 13 is moved to the right-hand side in the illustrations until the first plate 11 is fully accessible to the user and can be removed. If further pipetting is desired, the method can be started again with step S1, and so on.

Figure 3:
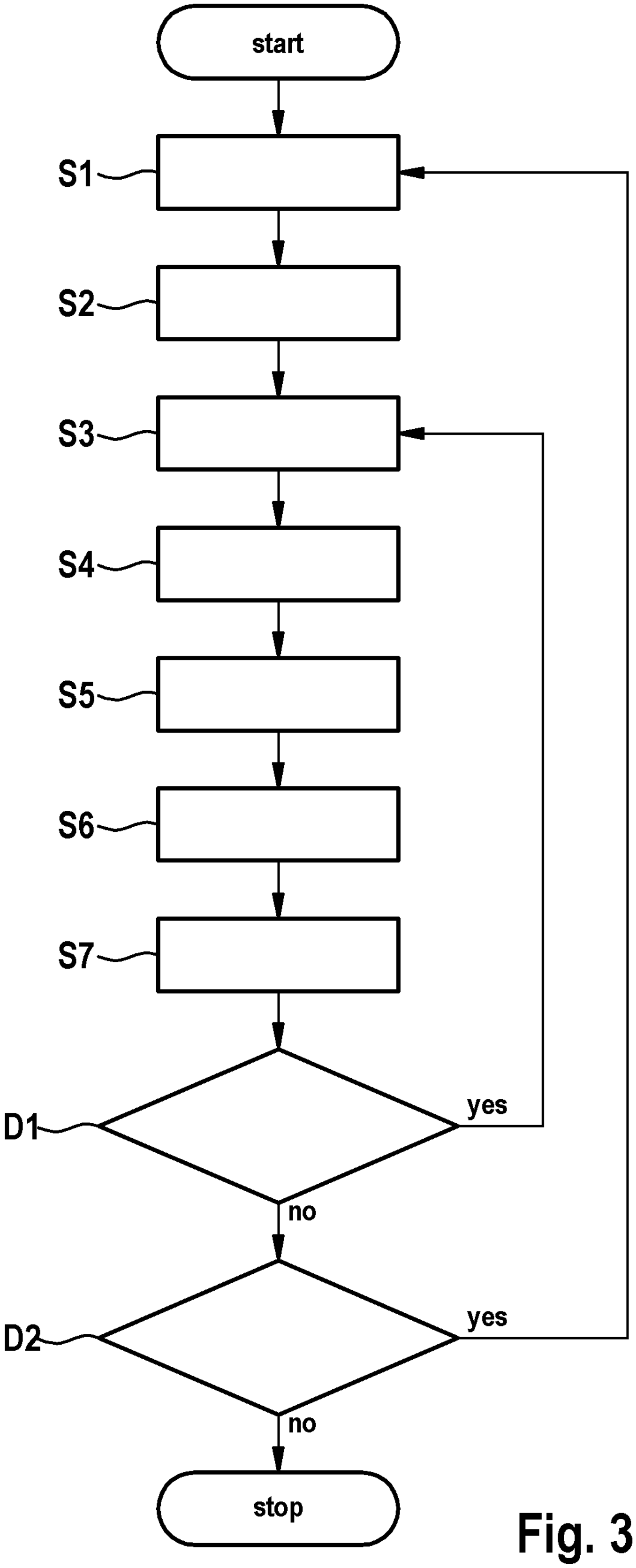
FIG. 3 is a flow chart of the embodiment of the method as illustrated in FIG. 2.

In regard to the method of the present disclosure, FIG. 3 shows a flow chart of the embodiment of the method as illustrated in FIG. 2. The flowchart of FIG. 3 is another, alternative illustration of the embodiment of a method according to the disclosure as shown in FIG. 2. The steps S1 to S7 as shown in FIG. 3 are the same steps S1 to S7 as described with regard to FIG. 2. For details regarding the steps S1 to S7, reference is made to the previous description of FIG. 2, in order to avoid unnecessary repetition. The method starts with the uppermost box in the flowchart of FIG. 3 labeled with "start". During that starting step, a pipetting support device 1 with one or more first plates 11 and one or more second, third, and-so-on plates 12, 12*a*, . . . is provided. In step S1, a first plate 11 and the second plate 12 are positioned within the pipetting support device 1. The moving unit 13 is moved until its straight edge 133 indicates the first row 111*a* of the first plate 11. In step S2 the samples from row 111*a* are manually pipetted into the single row of vessels in the second plate 12. In step S3, the foldable cover 131 of the moving unit 13 is opened. In step S4, the second plate 12 in the moving unit 13 is replaced manually by a third plate 12*a*. In step S5, the foldable cover 131 is closed to protect the inserted first plate 12*a* within the moving unit 13. In step S6, the moving unit 13 is moved on until its straight edge 131 indicates the next row 111*b* of vessels in the first plate 11 which has to be pipetted next. In step S7, the samples from row 111*b* are manually pipetted into the single row of vessels in the third plate 12*a*.

After finishing step S7, a decision step D1 has to be executed, i.e. the decision has to be made whether the first plate 11 comprises another row 111*a*, 111*b*, 111*c* of first vessels that has to be pipetted. If there is another row that has to be pipetted, the decision is "yes" and the method is continued at step S3 as described above. After the repetition of step S3, the following steps S4 to S7 are also repeated. After the repetition of step S7, the decision step D1 has to be executed again, until the decision in decision step D1 is "no", i.e. no further row is to be pipetted. After pipetting all the rows 111*a*, 111*b*, 111*c*, . . . of the first plate 11, another decision step D2 has to be executed. In decision step D2, it has to be decided whether another first plate 11 shall be pipetted or not. If the decision step D2 results in "yes", the method is continued/re-started starting with step S1 as described above. If the decision step D2 results in "no", the method is finished and stopped, as symbolized by the lowermost box in the flowchart of FIG. 3 labeled with "stop".

Figure 5:
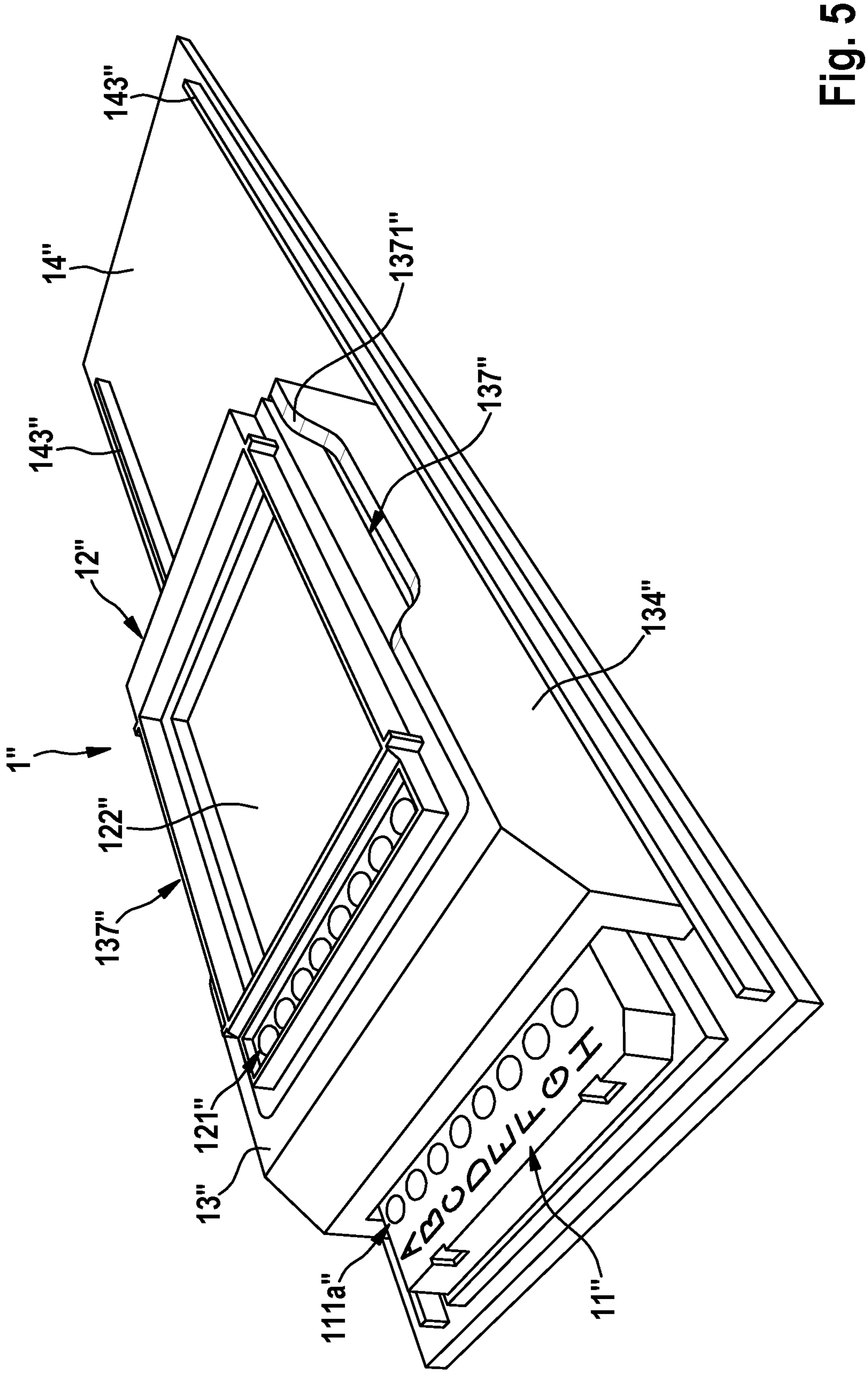
FIG. 5 is a conceptual perspective view of a pipetting support device according to another embodiment of the present disclosure.

The method described in regard to FIGS. 2 and 3 can also be performed using a pipetting support device 1" according to the embodiment as shown in FIG. 5. Since this embodiment of a pipetting support device 1" does not comprise a cover 131, 131', the respective method steps relating to the cover 131, 131' are to be omitted.

Figure 4:
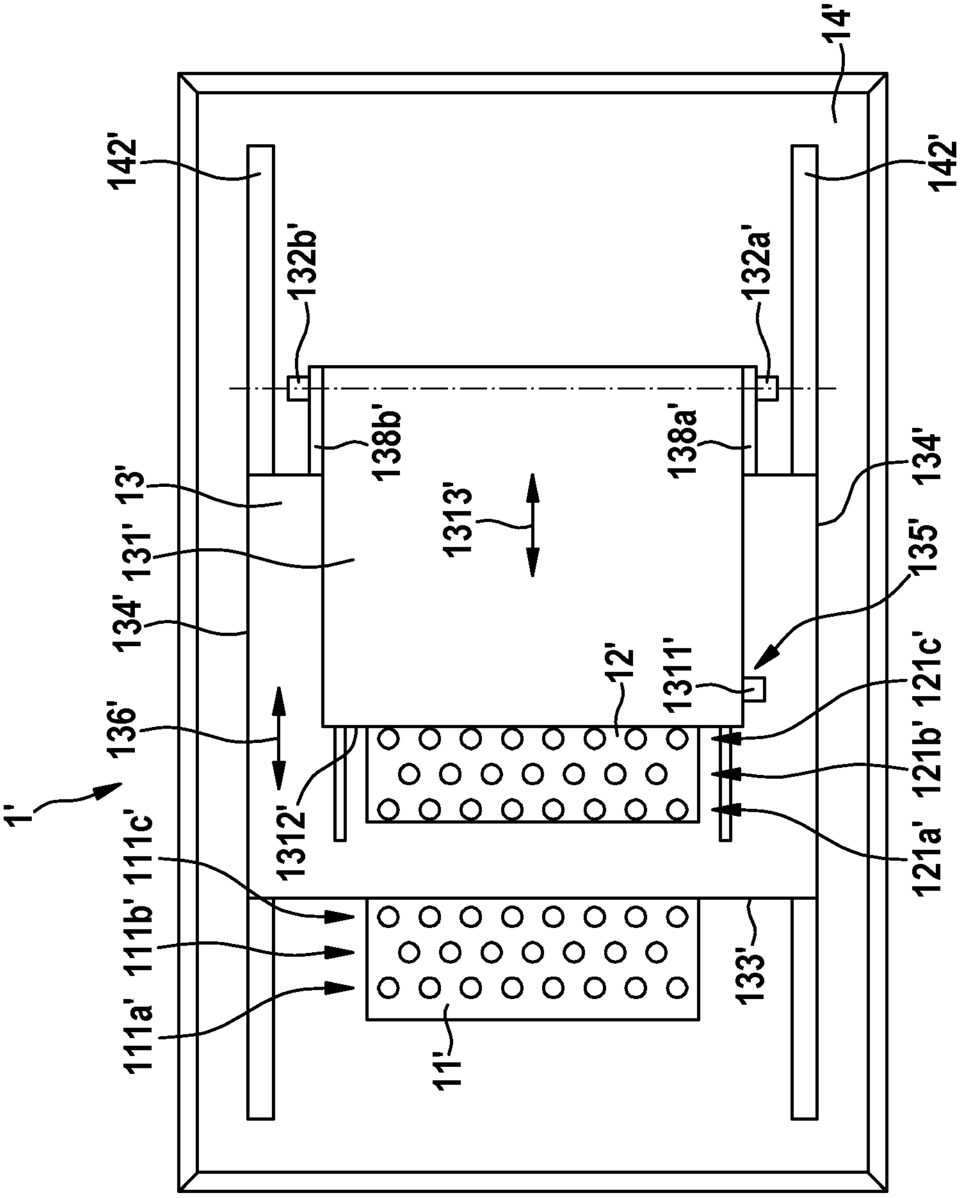
FIG. 4 is a conceptual top view of a pipetting support device according to another embodiment of the present disclosure.

Finally, FIG. 4 shows a conceptual top view of a pipetting support device 1' according to another, alternative embodiment of the present disclosure. The embodiment of pipetting support device 1' as illustrated in FIG. 4 has principally the same composition as the embodiment as illustrated in FIG. 1. A difference between the two embodiments is that the embodiment as shown in FIG. 4 comprises a second plate 12' that comprises multiple rows 121*a*', 121*b*', 121*c*', . . . of second vessels. Another difference between the two embodiments is to be found in the fact that the cover 131' in the embodiment of FIG. 4 is not only pivotable around the hinges 132*a*', 132*b*' but also linearly slidable along the guidings 138*a*', 138*b*'. The cover 131', therefore, is linearly movable in relation to the other parts of the moving unit 13'. The embodiment of the pipetting support device 1' as shown in FIG. 4 is also based on a baseplate 14'. The baseplate 14' comprises two longitudinal recesses 142' which are orientated parallel to the longitudinal lateral boundaries of the baseplate 14'. These longitudinal recesses 142' serve as guiding rails for the skids 134' of the moving unit 13'. The skids 134' are shaped and orientated similar to the skids 134 in the embodiment as shown in FIG. 1. The moving unit 13' can be linearly moved in a guided manner by the longitudinal recesses 142' as symbolized by the double arrow 136'. Similar to the embodiment as shown in FIG. 1, a first plate 11' is positioned on the baseplate 14'. The first plate 11' comprises multiple rows 111*a*', 111*b*', 111*c*', . . . of first vessels. The moving unit 13' partially covers the first vessels in the first plate 11'. The moving unit 13' comprises a straight edge 133' to indicate a particular row 111*a*', 111*b*', 111*c*', . . . of vessels in the first plate 11'.

The functional principal of the alternative embodiment a illustrated in FIG. 4 to guide and assist the user during pipetting regarding the vessels in the first plate 11' is identical to the functional principal as described for the embodiment illustrated in FIG. 1: The straight edge 133' is used as a guidance to indicate the current row of first vessels to be pipetted. After finishing pipetting a row of vessels, the moving unit 13' is moved further to indicate the next row to be pipetted. In the embodiment as illustrated in FIG. 4, this functional principal is also used to indicate the current row of vessels to be pipetted in the second plate 12'. To indicate the current row of vessels in the second plate 12', a straight edge 1312' of the linearly movable cover 131' is used. In the particular state as illustrated in FIG. 4, the straight edge 1312' is positioned on the right-hand side of row 121*c*' in the second plate 12' and indicates this row 121*c*' as currently to be pipetted. After finishing pipetting row 121*c*', the cover 131' is moved to the right-hand side until it indicates the next row 121*d*' which is not visible in the illustration in FIG. 4 because it is hidden beneath the cover 131'. The cover 131' is connected to the holding area 135' with the guidings 138*a*', 138*b*'. The guidings 138*a*', 138*b*' are slidably mounted in the holding area 135', for example in grooves which are arranged on the lower side of the holding area 135'. The guidings 138*a*', 138*b*' together with the other parts of the cover 131' can be moved in relation to the holding area 135' as symbolized by the double arrow 1313'. The two hinges 132*a*', 132*b*' are carried by the guidings 138*a*', 138*b*' and therefore moved together with the guidings 138*a*', 138*b*' when the cover 131' is positioned in relation to the holding area 135' and the second plate 12'. In order to be able to replace the second plate 12' in the moving unit 13', the cover 131' can be flapped about the hinges 132*a*', 132*b*'. The cover 131' comprises a handle 1311', which is arranged at longitudinal boundary of the cover 131', to make it easy for the user of the pipetting support device 1' to move the cover 131'.

FIG. 5 shows a conceptual perspective view of a pipetting support device 1" according to another embodiment of the present disclosure. Contrary to the embodiment as shown in FIG. 1, the embodiment as shown in FIG. 5 comprises no cover. The second plate 12" of the pipetting support device 1" is positioned in the upper part of moving unit 13". The second plate 12" comprises only one row 121" of second vessels. This one row 121" of second vessels is arranged at the end of the second plate 12", which is directed to the first row of vessels 111*a*" in the first plate 11". The second plate 12" comprises a cavity 122" positioned neighboring to the only row 121" of vessels. The second plate 12" in the embodiment shown in FIG. 5 is a microfluidic device. The only row 121" of vessels of the second plate 12" forms the inlets of the microfluidic device. The second plate 12" in the illustrated embodiment comprises channels (not shown) are provided for biological tests of the samples pipetted from the first plate 11" and start at the vessels in the only row 121", which direct away beneath the cavity 122". The implementation of the second plate 12" in the form of a microfluidic device, as it is shown in FIG. 5, is just one example. The second plate 12" can also have a different design and a different function. For example, the second plate 12" can be a microtiter plate, similar to the first plate 11".

The moving unit 13" of the pipetting support device 1" comprises a recess for accommodating the second plate 12". The shape of the recess matches the form of the second plate 12". Since the cavity 122" contains no unprotected samples or other objects in danger of contamination, there is no need for a cover 131 as provided in the embodiment of FIG. 1. In the embodiment as shown in FIG. 5, each row 111*a*", 111*b*", . . . of the first plate 11" is to be pipetted into a different second plate 12". In the state as shown in FIG. 5, the moving unit 13" is positioned in a way such that its indicating edge 133" indicates the first row of vessels 111*a*'. This first row of vessels 111*a*" comprises a number of eight vessels with their content to be pipetted into the only row of vessels 121" of the second plate 12", which also comprises eight vessels forming the respective inlets of the channels of the second plate 12". After pipetting samples from the first row of vessels 111*a*" to the only row of vessels 121", the second plate 12" is to be removed from the moving unit 13". Here, the second plate 12" is usually a consumable and, its shape can defer from the shape as illustrated in FIG. 5. The first plate 11" as shown in the embodiment in FIG. 5 is implemented as a microtiter plate made of plastic material and comprising an upper part with fiducial markers next to the visible first row 111*a*". The first plate 11" further comprises a lower part providing a projecting edge directed to the viewer. This protecting edge is provided for an easy recognition of the orientation of the first plate 11". The upper part and the lower part of the first plate 11" are permanently connected.

In order to relief removing of the second plate 12" from the moving unit 13", the moving unit 13" comprises two access clearances 137". One of these access clearances 137" is visible at the side with the skid 134", which is directed to the viewer. The other access clearance 137" is hidden behind the second plate 12" in the second side with the skid 134" on the opposite side of the moving unit 13" and is, thus not visible in FIG. 5. In general, the access clearances 137" are U-shaped recesses in the side walls of the moving unit 13" arranged above the skids 134". The access clearances 137" provide space for the user's fingers to reach and grip the second plate 12" during unloading and loading the same. It is also possible to provide the access clearances 137" with a different shape than the illustrated U-shape. In the embodiment as shown in FIG. 5, the access clearances 137" are limited on their sides opposite to the indicating edge 133" by bevelled edges 1371". These bevelled edges 1371" guide the second plate 12" during loading into the moving unit 13". The second plate 12" can slide over these bevelled edges 1371" and, therefore, is guided into the recess in the moving unit 13" meant to hold the second plate 12". The bevelled edges 1371" are part of the U-shape of the access clearances 137". However, the access clearances 137" can also have a different shape. For example, the bevelled edges 1371" can be omitted. In this case, the excess clearances 137" are no longer limited at the end of the moving unit 13" opposite to the indicating edge 133". Omitting the illustrated bevelled edges 1371" provides even better access for the user to the second plate 12". On the other hand, however, the guiding of the bevelled edges 1371" during insertion of a second plate 12" into the moving unit 13" is no longer available in case the bevelled edges 1371" are omitted.

The embodiment of the pipetting support device 1" as illustrated in FIG. 5 also comprises a base plate 14" on which the moving unit 13" and the first plate 11" are mutually arranged. The first plate 11" is a microtiter plate designed as a consumable product having low weight. Therefore, it can occur that the first plate 11" slips during pipetting accidentally, for example in the case when the first plate 11" is touched by the tip of the pipette. In order to prevent such an accidental slipping of the first plate 11", the first plate 11" is held and fixed by the base plate 14". In the embodiment as shown in FIG. 5, the baseplate 14" is provided with a sticking lamination on both its underside and its upper side. The sticking lamination on the underside of the baseplate 14" is provided for preventing such slipping between the pipetting support device 1" and the base onto which the pipetting support device 1" is placed on. The sticking lamination on the upper side of the baseplate 14" is provided in order to prevent slipping between the first plate 11" and the baseplate 14". Optionally, the baseplate 14" can also comprise a recess matching the form of the underside of the first plate 11". Such a formfitting recess can also be used to fix the first plate 11" in relation to the baseplate 14". The baseplate 14" of the embodiment as shown in FIG. 5 can be made of heavy material in order to provide good standing on the base the pipetting support device 1" is placed on. Here, the baseplate 14" comprises two guiding protrusions 143". The guiding protrusions 143" extend parallel to the long edges of the baseplate 14". Also, the guiding protrusions 143" protrude over the upper side of the baseplate 14" and are in contact with the outer surfaces of the skids 134" of the moving unit 13". Further, the guiding protrusions 143" guide the moving unit 13" during its movement in relation to the first plate 11" and the baseplate 14".

As far as it is not described otherwise above, the pipetting support device according to the embodiment as illustrated in FIG. 5 corresponds to the pipetting support device according to the embodiment as illustrated in FIG. 1.

While the current disclosure has been described in relation to its specific embodiments, it is to be understood that this description is for illustrative purposes only. Accordingly, it is intended that the disclosure be limited only by the scope of the claims appended hereto. In addition, various publications are cited herein, the disclosures of which are incorporated by reference in their entireties.

LIST OF REFERENCE NUMERALS

1 pipetting support device
1' pipetting support device
1" pipetting support device
11 first plate
111*a*, 111*b*, 111*c* row of vessels in the first plate
11' first plate
111*a*', 111*b*', 111*c*' row of vessels in the first plate
11"first plate
111*a*", 111*b*" row of vessels in the first plate
12 second plate
12*a* third plate
12' second plate
121*a*', 121*b*', 121*c*' row of vessels in the second plate
12" second plate
121" row of vessels in the second plate
122" cavity
13 moving unit
131 cover
1311 handle
132*a*, 132*b* hinge
133 edge
134 skid
135 holding area
136 double arrow
13' moving unit
131' cover
1311' handle
1312' edge
1313' double arrow
132*a*', 132*b*' hinge
133' edge
134' skid
135' holding area
136' double arrow
138*a*', 138*b*' guiding
13" moving unit
133" edge
134" skid
137" access clearance
1371" bevelled edge
14 baseplate
141 circumferential rim
14' baseplate
142' recess
14" baseplate
143" guiding protrusion
S1-S7 method steps
D1 first decision
D2 second decision

The invention claimed is:

1. A method of using a pipetting support device for pipetting liquid between at least one first plate containing a number of first vessels and at least one second plate containing a number of second vessels, the pipetting support device comprising:
the at least one first plate comprising at least one row of first vessels;
the at least one second plate comprising at least one row of second vessels; and
at least one moving unit holding said second plate;
wherein the moving unit is movable in relation to said first plate and at least partially covers said first plate during use of the pipetting support device; and
wherein at least one edge of the moving unit is an indicating edge for indicating a row of first vessels of the first plate to be pipetted by a user for providing guidance to support a manual pipetting procedure between said first plate and said second plate;
the method comprising the steps of:
placing said first plate under the moving unit of the pipetting support device;
moving the moving unit in relation to said first plate said at least one edge of the moving unit indicates a first row of vessels in said first plate;
placing said second plate on or into the moving unit;
manually pipetting liquid from said indicated row in the first plate to a row of vessels in said second plate; and
moving the moving unit in relation to said first plate until said at least one edge of the moving unit indicates another row of vessels in said first plate.

2. The method according to claim 1, further comprising the steps of
replacing said second plate by a third plate after the step of moving the moving unit and before pipetting liquid from said next neighboring row of vessels in said first plate;
manually pipetting liquid from said indicated neighboring row in the first plate to a row of vessels in said third plate; and
repeating all preceding steps until all targeted liquid from said first plate has been pipetted.

3. The method according to claim 1, wherein the moving unit comprises a moving unit cover at least partially covering said second plate and being movable above said second plate, and wherein the moving unit cover comprises at least one edge providing guidance to support a manual pipetting procedure, further comprising the steps of moving the moving unit cover until said at least one edge indicates a second row of vessels in said second plate, manually pipetting liquid from said indicated row of vessels in the first plate to said indicated row of vessels in said second plate, and repeating all preceding steps until all targeted liquid from said first plate is pipetted to said second plate.

4. The method of claim 1, wherein said second plate is located above said first plate and is movable by means of the moving unit above said first.

5. The method of claim 1, wherein the moving unit is slidable above said first plate in a direction perpendicular to the row of vessels in said first plate.

6. The method of claim 1, wherein the at least one edge of the moving unit is a straight edge for indicating one of vessels of said first plate during pipetting.

7. The method of claim 1, wherein the moving unit has the shape of a sledge and comprises skids that are arranged essentially rectangular in regard to the at least one edge of the moving unit.

8. The method of claim 7, wherein the distance between said skids is adaptable to the dimensions of said first plate.

9. The method of claim 8, wherein said baseplate comprises means against slipping in relation to a base the pipetting support device is placed on.

10. The method of claim 9, wherein the pipetting support device further comprises one or more of the following: (a) the baseplate comprises a loading to increase its weight, and (b) the baseplate comprises a sticking lamination at its underside.

11. The method of claim 1, wherein said first plate and the moving unit containing said second plate are mutually arranged on a baseplate.

12. The method of claim 11, wherein said baseplate fixates said first plate, and wherein the moving unit is movable in relation to the baseplate and said fixed first plate.

13. The method of claim 1, wherein the moving unit comprises a cover at least partially covering said second plate.

14. The method of claim 13, wherein the cover is linearly movable relative to the second plate, and wherein the cover comprises an additional indicating edge for indicating a row of second vessels of the second plate to be pipetted by a user, the cover being configured to move linearly relative to the second plate so as to indicate a different row of second vessels to be pipetted.

* * * * *